(12) United States Patent
Smith et al.

(10) Patent No.: US 8,457,131 B2
(45) Date of Patent: Jun. 4, 2013

(54) DYNAMIC TABLE SHARING OF MEMORY SPACE WITHIN A NETWORK DEVICE

(75) Inventors: Brandon Carl Smith, Sunnyvale, CA (US); Jun Cao, Sunnyvale, CA (US)

(73) Assignee: Broadcom Corporation, Irvine, CA (US)

(*) Notice: Subject to any disclaimer, the term of this patent is extended or adjusted under 35 U.S.C. 154(b) by 1201 days.

(21) Appl. No.: 11/084,482

(22) Filed: Mar. 21, 2005

(65) Prior Publication Data

US 2006/0187930 A1    Aug. 24, 2006

Related U.S. Application Data

(60) Provisional application No. 60/653,943, filed on Feb. 18, 2005.

(51) Int. Cl.
*H04L 12/56* (2006.01)

(52) U.S. Cl.
USPC ...... 370/395.31; 370/401; 370/419; 370/429; 370/465

(58) Field of Classification Search
USPC .................................................. 370/389, 392
See application file for complete search history.

(56) References Cited

U.S. PATENT DOCUMENTS

| | | | |
|---|---|---|---|
| 5,414,704 A | 5/1995 | Spinney | |
| 5,423,015 A | 6/1995 | Chung | |
| 5,652,579 A | 7/1997 | Yamada | |
| 5,802,287 A | 9/1998 | Rostoker | |
| 5,831,980 A | 11/1998 | Varma | |
| 5,892,922 A | 4/1999 | Lorenz | |
| 5,898,689 A | 4/1999 | Kumar | |
| 5,909,686 A | 6/1999 | Muller | |
| 6,011,795 A | 1/2000 | Varghese | |
| 6,016,310 A | 1/2000 | Muller | |
| 6,041,053 A | 3/2000 | Douceur | |
| 6,119,196 A * | 9/2000 | Muller et al. | 710/243 |
| 6,173,384 B1 | 1/2001 | Weaver | |
| 6,175,902 B1 | 1/2001 | Runaldue | |
| 6,222,841 B1 | 4/2001 | Taniguchi | |
| 6,259,699 B1 | 7/2001 | Opalka | |
| 6,335,935 B2 | 1/2002 | Kadambi | |
| 6,425,015 B1 | 7/2002 | Jennings | |
| 6,591,299 B2 | 7/2003 | Riddle | |
| 7,359,380 B1 * | 4/2008 | Maufer et al. | 370/392 |
| 2002/0080789 A1 * | 6/2002 | Henderson et al. | 370/392 |

(Continued)

FOREIGN PATENT DOCUMENTS

| | | |
|---|---|---|
| WO | 99/00950 | 1/1999 |
| WO | 01/24428 | 4/2001 |

*Primary Examiner* — Andrew Chriss
*Assistant Examiner* — Salvador E Rivas

(57) ABSTRACT

A network device for processing data on a data network includes a port interface configured to receive a data packet from a data network and to send a processed data packet to an egress port of the plurality of ports, a packet evaluation module configured to parse the received data packet and modify the received data packet to form the processed data packet and a search engine configured to perform searches of lookup tables using parsed data packet values and to return search results to the packet evaluation module to assist in modifying the received data packet. At least one lookup table shares at least two different types of entries in that same at least one lookup table, where the search engine is configured to distinguish between the at least two different types of entries in that same at least one lookup table.

23 Claims, 9 Drawing Sheets

U.S. PATENT DOCUMENTS

| | | | |
|---|---|---|---|
| 2003/0026260 A1* | 2/2003 | Ogasawara et al. | 370/392 |
| 2003/0219023 A1* | 11/2003 | Miyata et al. | 370/395.53 |
| 2004/0162943 A1* | 8/2004 | Degenaro et al. | 711/118 |
| 2005/0047329 A1* | 3/2005 | Almog et al. | 370/225 |
| 2005/0053074 A1* | 3/2005 | Wybenga et al. | 370/395.43 |
| 2005/0106941 A1* | 5/2005 | Witchey | 439/620 |
| 2005/0132126 A1* | 6/2005 | Lin et al. | 711/103 |
| 2005/0152332 A1* | 7/2005 | Hannum et al. | 370/351 |
| 2005/0254452 A1* | 11/2005 | Yang et al. | 370/328 |
| 2006/0133389 A1* | 6/2006 | Wybenga et al. | 370/401 |

* cited by examiner

US 8,457,131 B2

DYNAMIC TABLE SHARING OF MEMORY SPACE WITHIN A NETWORK DEVICE

CROSS-REFERENCE TO RELATED APPLICATIONS

This application claims priority of U.S. Provisional Patent Application Ser. No. 60/653,943, filed on Feb. 18, 2005. The subject matter of this earlier filed application is hereby incorporated by reference.

BACKGROUND OF THE INVENTION

1. Field of the Invention

The present invention relates to a network device for processing data in a network and more particularly to use of memory in a network device that allows for static and dynamic sharing of tables.

2. Description of the Related Art

A network may include one or more network devices, such as Ethernet switches, each of which includes several modules that are used to process information that is transmitted through the device. Specifically, the device may include port interface modules, designed to send and receive data over a network, a Memory Management Unit (MMU), to store that data until it is forwarded or further processed and resolution modules, that allow the data to be reviewed and processed according to instructions. The resolution modules include switching functionalities for determining to which destination port data should be directed. One of the ports on the network device may be a CPU port that enables the device to send and receive information to and from external switching/routing control entities or CPUs.

Many network devices operate as Ethernet switches, where packets enter the device from multiple ports, where switching and other processing are performed on the packets. Thereafter, the packets are transmitted to one or more destination ports through the MMU. The process of determining an egress port for a packet involves examining the packet to determine attributes.

Part of the process of determining the packet attributes includes searching of table entries in memory to determine quantities to direct and modify the packet. For example, an IP destination address may be derived from the packet header, that may not, without table lookups, determine an egress port of the network device that the packet should be sent from to reach that destination IP address. Such a decision process requires a lookup in the memory tables. However, memory available to the device is finite and requirements for tables and table sizes may not be known definitively until the network device is put into service. Thus, there is a need for a network device that allows for more flexible usage of tables in memory to comport with different network traffic situations.

BRIEF DESCRIPTION OF THE DRAWINGS

The accompanying drawings, which are included to provide a further under-standing of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
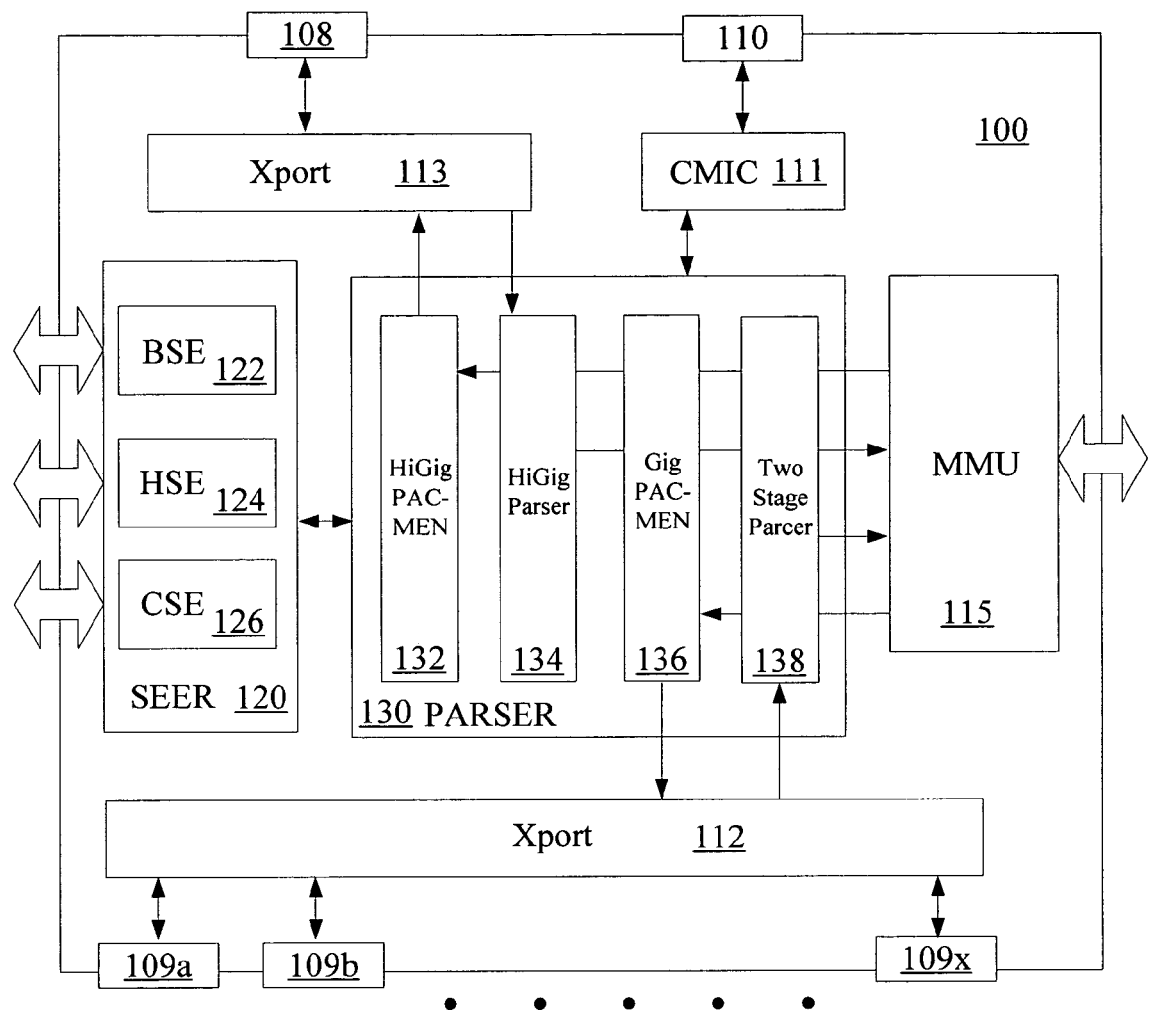
FIG. 1 illustrates a network device in which an embodiment of the present invention may be implemented.

FIG. 1 illustrates a network device, such as a switching chip, in which an embodiment the present invention may be implemented. Device 100 includes ingress/egress modules 112 and 113, a MMU 115, a parser 130 and a search engine 120. Ingress/egress modules are used for buffering of data and forwarding the data to the parser. The parser 130 parses the data received and performs look ups based on the parsed data using the search engine 120. The primary function of MMU 115 is to efficiently manage cell buffering and packet pointer resources in a predictable manner, even under severe congestion scenarios. Through these modules, packet modification can occur and the packet can be transmitted to an appropriate destination port.

According to several embodiments, the device 100 may also include one internal fabric high speed port, for example a HiGig™ port or high speed port, 108, one or more external Ethernet ports 109*a*-109*x*, and a CPU port 110. High speed port 108 is used to interconnect various network devices in a system and thus form an internal switching fabric for transporting packets between external source ports and one or more external destination ports. As such, high speed port 108 may not be externally visible outside of a system that includes the multiple interconnected network devices. CPU port 110 is used to send and receive information to and from external switching/routing control entities or CPUs. According to an embodiment of the invention, CPU port 110 may be considered as one of external Ethernet ports 109*a*-109*x*. Device 100 interfaces with external/off-chip CPUs through a CPU processing module 111, such as a CMIC, which interfaces with a PCI bus that connects device 100 to an external CPU.

In addition, the search engine module 120 may be composed of additional search engine modules, 122, 124 and 126, that are used to perform particular look ups that are used in the characterization and modification of data being processed by the network device 100. Likewise, the parser 130 also includes additional modules that are directed to parsing data received from the internal fabric high speed port 134 and the other ports 138, with other modules 132 and 136 for forwarding data back to the ports of the network device. The high speed port 134 and the two stage 138 parsers are discussed in greater detail below.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports twelve physical Ethernet ports 109, each of which can operate in 10/100/1000 Mbps speed and one high speed port 108 which operates in either 10 Gbps or 12 Gbps speed.

Figure 2:
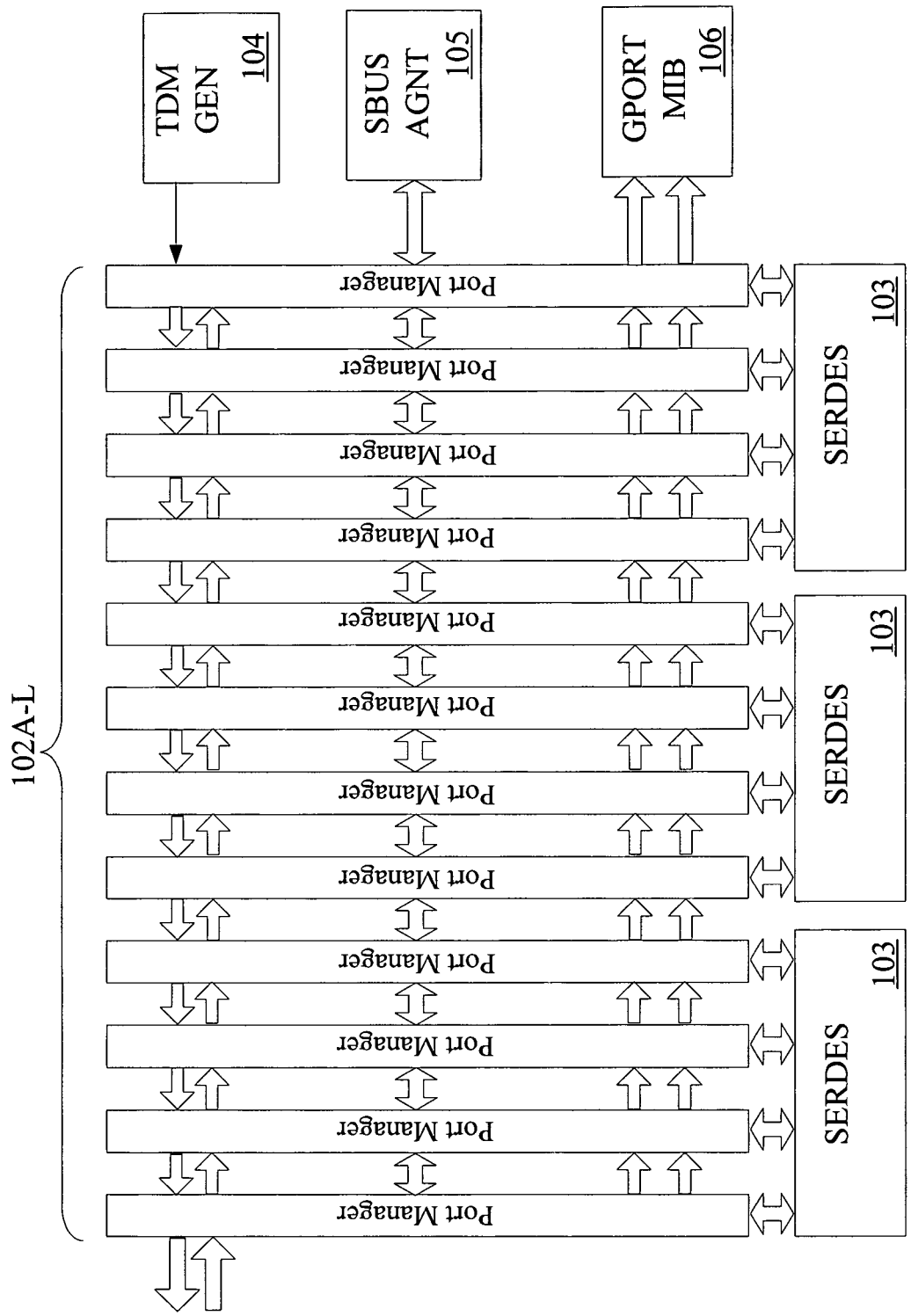
FIG. 2 illustrates a block diagram illustrating the communication using ports of the network device, according to an embodiment of the instant invention.

The structure of the physical ports 109 are further illustrated in FIG. 2. A series of serializing/deserializing modules 103 send and receive data, where data received as each port is managed by a port manager 102A-L. The series of port managers have a timing generator 104 and a bus agent 105 that facilitate their operation. The data received and transmitted to a port information base so that the flow can be monitored. It is noted that high speed port 108 has similar functionalities but does not require as many elements since only one port is being managed.

Figure 3A:
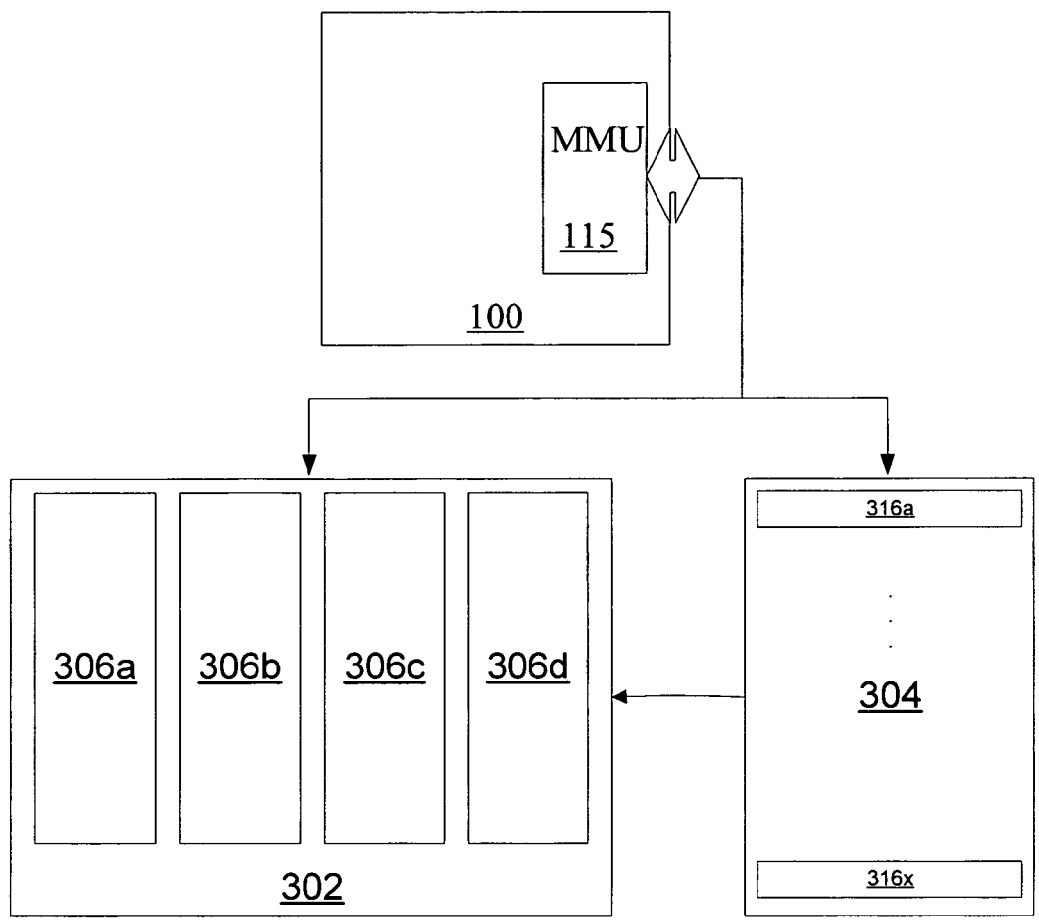
FIG. 3 illustrates memory structures to be used with the network device, with FIG. 3*a* illustrating the shared memory that is external to the network device and FIG. 3*b* illustrating the Cell Buffer Pool of the shared memory architecture.
Figure 3B:
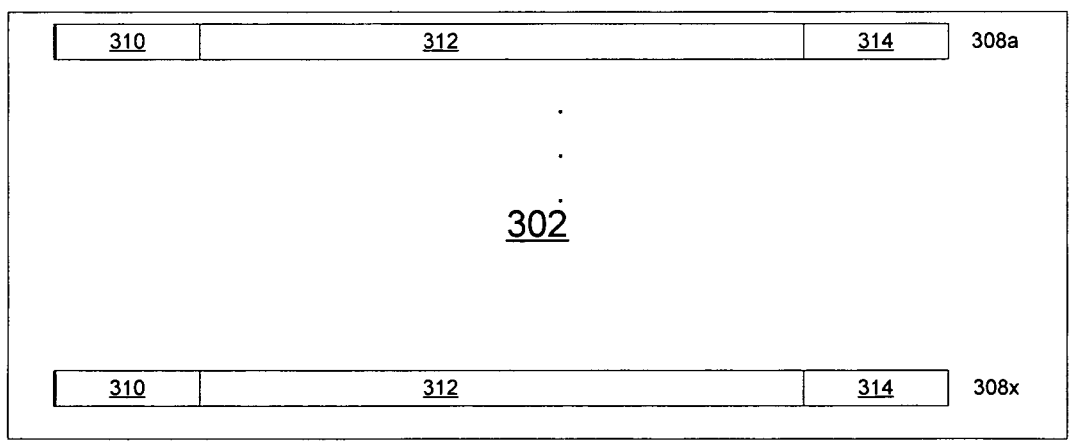

In an embodiment of the invention, device 100 is built around a shared memory architecture, as shown in FIGS. 3a-3b wherein MMU 115 enables sharing of a packet buffer among different ports while providing for resource guarantees for every ingress port, egress port and class of service queue associated with each egress port. FIG. 3a illustrates the shared memory architecture of the present invention. Specifically, the memory resources of device 100 include a Cell Buffer Pool (CBP) memory 302 and a Transaction Queue (XQ) memory 304. CBP memory 302 is an off-chip resource that is made of, according to some embodiments, 4 DRAM chips 306a-306d. According to an embodiment of the invention, each DRAM chip has a capacity of 288 Mbits, wherein the total capacity of CBP memory 302 is 122 Mbytes of raw storage. As shown in FIG. 3b, CBP memory 302 is divided into 256K 576-byte cells 308a-308x, each of which includes a 32 byte header buffer 310, up to 512 bytes for packet data 312 and 32 bytes of reserved space 314. As such, each incoming packet consumes at least one full 576 byte cell 308. Therefore in an example where an incoming includes a 64 byte frame, the incoming packet will have 576 bytes reserved for it even though only 64 bytes of the 576 bytes is used by the frame.

Returning to FIG. 3a, XQ memory 304 includes a list of packet pointers 316a-316x into CBP memory 302, wherein different XQ pointers 316 may be associated with each port. A cell count of CBP memory 302 and a packet count of XQ memory 304 is tracked on an ingress port, egress port and class of service basis. As such, device 100 can provide resource guarantees on a cell and/or packet basis.

Figure 4:
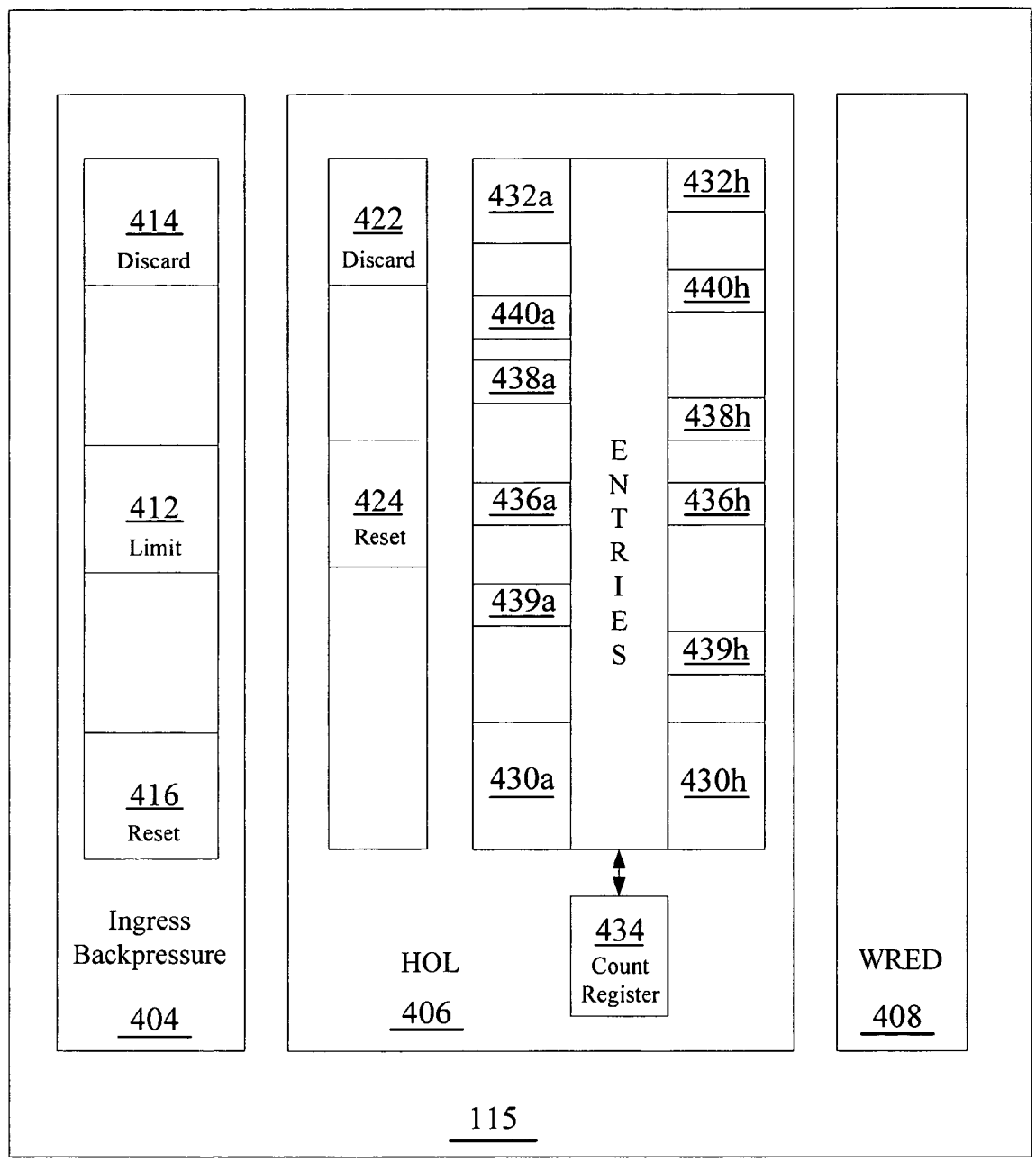
FIG. 4 illustrates buffer management mechanisms that are used by the memory management unit to impose resource allocation limitations and thereby ensure fair access to resource.

Once a packet enters device 100 on a source port 109, the packet is transmitted to parser 130 for processing. During processing, packets on each of the ingress and egress ports share system resources 302 and 304. In specific embodiments, two separate 64 byte bursts of packets are forwarded to the MMU from the local ports and the high speed port. FIG. 4 illustrates buffer management mechanisms that are used by MMU 115 to impose resource allocation limitations and thereby ensure fair access to resources. MMU 115 includes an ingress backpressure mechanism 404, a head of line mechanism 406 and a weighted random early detection mechanism 408. The ingress backpressure mechanism 404 supports lossless behaviour and manages buffer resources fairly across ingress ports. Head of line mechanism 406 supports access to buffering resources while optimizing throughput in the system. Weighted random early detection mechanism 408 improves overall network throughput.

The ingress backpressure mechanism 404 uses packet or cell counters to track the number of packets or cells used on an ingress port basis. The ingress backpressure mechanism 404 includes registers for a set of 8 individually configurable thresholds and registers used to specify which of the 8 thresholds are to be used for every ingress port in the system. The set of thresholds include a limit threshold 412, a discard limit threshold 414 and a reset limit threshold 416. If a counter associated with the ingress port packet/cell usage rises above discard limit threshold 414, packets at the ingress port will be dropped. Based on the counters for tracking the number of cells/packets, a pause flow control is used to stop traffic from arriving on an ingress port that have used more than its fair share of buffering resources, thereby stopping traffic from an offending ingress port and relieving congestion caused by the offending ingress port.

Specifically, each ingress port keeps track of whether or not it is in an ingress backpressure state based on ingress backpressure counters relative to the set of thresholds. When the ingress port is in ingress backpressure state, pause flow control frames with a timer value of (0xFFFF) are periodically sent out of that ingress port. When the ingress port is no longer in the ingress backpressure state, the pause flow control frame with a timer value of 0x00 is sent out of the ingress port and traffic is allowed to flow again. If an ingress port is not currently in an ingress backpressure state and the packet counter rises above limit threshold 412, the status for the ingress port transitions into the ingress backpressure state. If the ingress port is in the ingress backpressure state and the packet counter falls below reset limit threshold 416, the status for the port will transition out of the backpressure state.

The head of line mechanism 406 is provided to support fair access to buffering resources while optimizing throughput in the system. The head of line mechanism 406 relies on packet dropping to manage buffering resources and improve the overall system throughput. According to an embodiment of the invention, the head of line mechanism 406 uses egress counters and predefined thresholds to track buffer usage on a egress port and class of service basis and thereafter makes decisions to drop any newly arriving packets on the ingress ports destined to a particular oversubscribed egress port/class of service queue. Head of line mechanism 406 supports different thresholds depending on the color of the newly arriving packet. Packets may be colored based on metering and marking operations that take place in the ingress module and the MMU acts on these packets differently depending on the color of the packet.

According to an embodiment of the invention, head of line mechanism 406 is configurable and operates independently on every class of service queue and across all ports, including the CPU port. Head of line mechanism 406 uses counters that track XQ memory 304 and CBP memory 302 usage and thresholds that are designed to support a static allocation of CBP memory buffers 302 and dynamic allocation of the available XQ memory buffers 304. A discard threshold 422 is defined for all cells in CBP memory 302, regardless of color marking. When the cell counter associated with a port reaches discard threshold 422, the port is transition to a head of line status. Thereafter, the port may transition out of the head of line status if its cell counter falls below a reset limit threshold 424.

For the XQ memory 304, a guaranteed fixed allocation of XQ buffers for each class of service queue is defined by a XQ entry value 430a-430h. Each of XQ entry value 430a-430h defines how many buffer entries should be reserved for an associated queue. For example, if 100 bytes of XQ memory are assigned to a port, the first four class of service queues associated with XQ entries 430a-430d respectively may be assigned the value of 10 bytes and the last four queues associated with XQ entries 430d-430h respectively may be assigned the value of 5 bytes.

According to an embodiment of the invention, even if a queue does not use up all of the buffer entries reserved for it according to the associated XQ entry value, the head of line mechanism 406 may not assign the unused buffer to another queue. Nevertheless, the remaining unassigned 40 bytes of XQ buffers for the port may be shared among all of the class of service queues associated with the port. Limits on how much of the shared pool of the XQ buffer may be consumed by a particular class of service queue is set with a XQ set limit threshold 432. As such, set limit threshold 432 may be used to define the maximum number of buffers that can be used by one queue and to prevent one queue from using all of the available XQ buffers. To ensure that the sum of XQ entry values 430a-430h do not add up to more than the total number of available XQ buffers for the port and to ensure that each class of service queue has access to its quota of XQ buffers as assigned by its entry value 430, the available pool of XQ buffer for each port is tracked using a port dynamic count register 434, wherein the dynamic count register 434 keeps track of the number of available shared XQ buffers for the port. The initial value of dynamic count register 434 is the total number of XQ buffers associated with the port minus a sum of the number of XQ entry values 430a-430h. Dynamic count register 434 is decremented when a class of service queue uses an available XQ buffer after the class of service queue has exceeded its quota as assigned by its XQ entry value 430. Conversely, dynamic count register 434 is incremented when a class of service queue releases a XQ buffer after the class of service queue has exceeded its quota as assigned by its XQ entry value 430.

When a queue requests XQ buffer 304, head of line mechanism 406 determines if all entries used by the queue is less than the XQ entry value 430 for the queue and grants the buffer request if the used entries are less then the XQ entry value 430. If however, the used entries are greater than the XQ entry value 430 for the queue, head of line mechanism 406 determines if the amount requested is less than the total available buffer or less then the maximum amount set for the queue by the associated set limit threshold 432. Set limit threshold 432 is in essence a discard threshold that is associated with the queue, regardless of the color marking of the packet. As such, when the packet count associated with the packet reaches set limit threshold 432, the queue/port enters into a head of line status. When head of line mechanism 406 detects a head of line condition, it sends an update status so that packets can be dropped on the congested port.

However, due to latency, there may be packets in transition between the MMU 115 and the ports and when the status update is sent by head of line mechanism 306. In this case, the packet drops may occur at MMU 115 due to the head of line status. In an embodiment of the invention, due to the pipelining of packets, the dynamic pool of XQ pointers is reduced by a predefined amount. As such, when the number of available XQ pointers is equal to or less than the predefined amount, the port is transition to the head of line status and an update status is sent to by MMU 115 to the ports, thereby reducing the number of packets that may be dropped by MMU 115. To transition out of the head of line status, the XQ packet count for the queue must fall below a reset limit threshold 436.

It is possible for the XQ counter for a particular class of service queue to not reach set limit threshold 432 and still have its packet dropped if the XQ resources for the port are oversubscribed by the other class of service queues. In an embodiment of the invention, intermediate discard thresholds 438 and 439 may also be defined for packets containing specific color markings, wherein each intermediate discard threshold defines when packets of a particular color should be dropped. For example, intermediate discard threshold 438 may be used to define when packets that are colored yellow should be dropped and intermediate discard threshold 439 may be used to define when packets that are colored red should be dropped. According to an embodiment of the invention, packets may be colored one of green, yellow or red depending on the priority level assigned to the packet. To ensure that packets associated with each color are processed in proportion to the color assignment in each queue, one embodiment of the present invention includes a virtual maximum threshold 440. Virtual maximum threshold 440 is equal to the number of unassigned and available buffers divided by the sum of the number of queues and the number of currently used buffers. Virtual maximum threshold 440 ensures that the packets associated with each color are processed in a relative proportion. Therefore, if the number of available unassigned buffers is less than the set limit threshold 432 for a particular queue and the queue requests access to all of the available unassigned buffers, head of line mechanism 406 calculates the virtual maximum threshold 440 for the queue and processes a proportional amount of packets associated with each color relative to the defined ratios for each color.

To conserve register space, the XQ thresholds may be expressed in a compressed form, wherein each unit represents a group of XQ entries. The group size is dependent upon the number of XQ buffers that are associated with a particular egress port/class of service queue.

Weighted random early detection mechanism 408 is a queue management mechanism that preemptively drops packets based on a probabilistic algorithm before XQ buffers 304 are exhausted. Weighted random early detection mechanism 408 is therefore used to optimize the overall network throughput. Weighted random early detection mechanism 408 includes an averaging statistic that is used to track each queue length and drop packets based on a drop profile defined for the queue. The drop profile defines a drop probability given a specific average queue size. According to an embodiment of the invention, weighted random early detection mechanism 408 may defined separate profiles on based on a class of service queue and packet.

Figure 5:
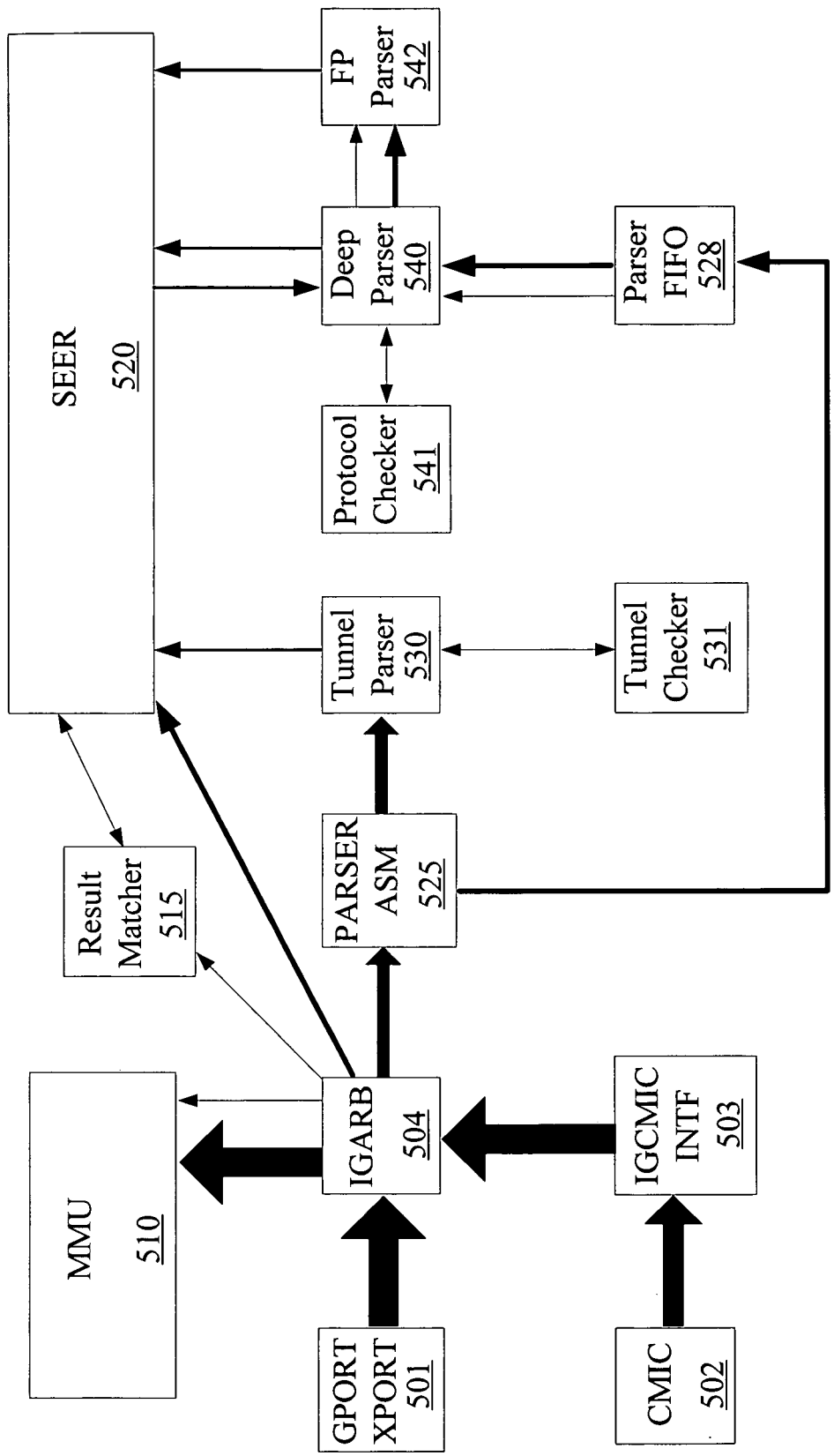
FIG. 5 illustrates a two stage parser, according to certain embodiments of the present invention.

As illustrated in FIG. 1, the MMU 115 receives packet data for storage from the parser 130. As discussed above, the parser 130 includes a two stage parser, where that portion is illustrated schematically in FIG. 5. The data are received at ports 501 of the network device, as discussed above. Data may also be received through the CMIC 502, where that data is passed to an ingress CMIC interface 503. The interface acts to convert the CMIC data from a P-bus format to an ingress data format. In one embodiment, the data is converted from 45-bit to 168-bit format, such that the latter format includes 128-bit data, 16-bit control and possibly a 24-bit high speed header. The data are thereafter sent in 64-bit bursts to the ingress arbiter 504.

The ingress arbiter 504 receives data from the ports 501 and the ingress CMIC interface 503, and multiplexes those inputs based on time division multiplexing arbitration. Thereafter, the data are sent to the MMU 510, where any high speed header is removed and the format is set to a MMU interface format. Packet attributes are checked, such as end-to-end, Interrupted Bernoulli Process (IBP) or Head of Line (HOL) packets. In addition, the first 128 bytes of data are snooped and the high speed header is passed to the parser ASM 525. If the burst of data received contains an end marker, the CRC result is sent to the result matcher 515. Also, the packet length is estimated from the burst length and a 126-bit packet ID is generated for debugging purposes.

The parser ASM 525 converts the 64 data burst, at 4 cycles per burst, into 128-byte burst, at 8 cycles per burst. The 128-byte burst data is forwarded to both the tunnel parser 530 and the parser FIFO 528 at the same time to maintain the same packet order. The tunnel parser 530 determines whether any type of tunnel encapsulation, including MPLS and IP tunnelling, is being employed. In addition, the tunnel parser also checks for outer and inner tags. Through the parsing process, the session initiated protocol (SIP) is provided for subnet based VLAN, where the SIP parsing occurs if the packet is an address resolution protocol (ARP), reverse ARP (RARP) or IP packet. A trunk port grid ID is also constructed based on the source trunk map table, unless there is no trunking or if the trunk ID is obtained from the high speed header.

The tunnel parser 530 works with the tunnel checker 531. The tunnel checker checks the checksum of the IP header, and characteristics of UDP tunnelling and IPv6 over IPv4 packets. The tunnel parser 530 utilizes the search engine 520 to determine the tunnel type through preconfigured tables.

The parser FIFO 528 stores 128 bytes of packet headers and 12 bytes of high speed headers, that is parsed again by the deep parser 540. The header bytes are stored while the search engine completes a search and is ready for the deeper search. Other attributes are also maintained by the FIFO, such as packet length, high speed header status and the packet ID. The deep parser 540 provides three different types of data, including search results from the search engine 520 that are "flow through," inner parser results and high speed module header. Special packet types are determined and passed along to the search engine. The deep parser 540 reads the data from the parser FIFO, where pre-defined fields are parsed. The search engine provides lookup results based on the values passed to the search engine, where the packet ID is checked to maintain packet order.

The deep parser 540 also uses the protocol checker 541 to check the inner IP header checksum, check for denial of service attack attributes, errors in the high speed module header and perform a martian check. The deep parser also works with the field processor parser 542, to parse predefined fields and user defined fields. The predefined fields are received from the deep parser. These fields include MAC destination address, MAC source address, inner and outer tags, Ether type, IP destination and source addresses, Type of Service, IPP, IP flags, TDS, TSS, TTL, TCP flags and flow labels. User defined fields are also parsible, up to 128-bit lengths.

Figure 6:
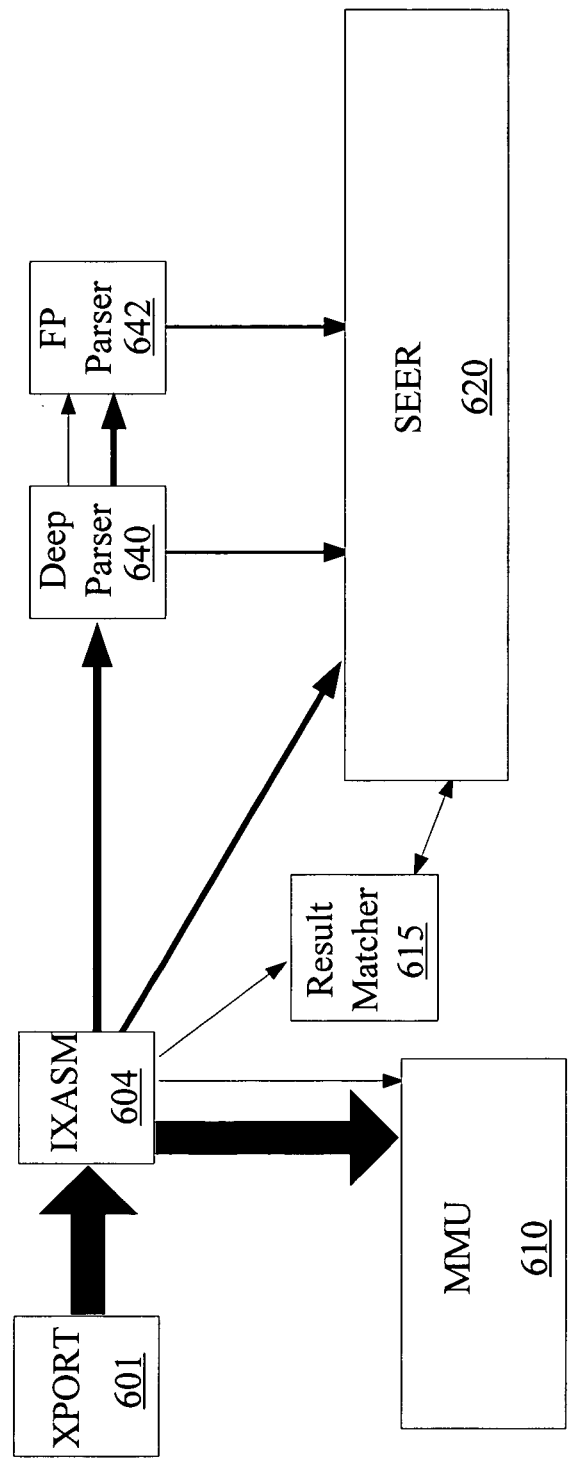
FIG. 6 illustrates another parser for use with interconnected port, according to certain embodiments of the present invention.

As discussed above, the data that is received on the high speed port is treated separately from other data received on the local ports. As illustrated in FIG. 1, high speed port 108 has its own buffers and data flows from the port to its own parser 134. The high speed parser is illustrated in greater detail than FIG. 6. The structure is similar to the two stage parser, illustrated in FIG. 5, with several differences. Data received at the high speed port 601 is forwarded to the high speed port assembler 604. The assembler receives the data and high speed header in 64 byte bursts, with a similar format as used for the local ports. The data are sent to the MMU 610 without the high speed header and in a MMU interface format.

The first 128 bytes of the data is snooped and sent, along with the high speed header, to the deep parser 640. With similarity to the two stage parser, end-to-end message are checked, with the parsed results being sent in a side band. Also similarly, the CRC and packet lengths are checked by the result matcher 615. In addition, a 16 bit packet ID is generated for use in debugging and tracking the flow of the packet.

The high speed version of the deep parser 640 is a subset of the two stage deep parser 540, and performs similar functions. There is, however, no pass through of information from the search engine 620, it cannot skip the MPLS header and parse the payload only and does not send deep data to the search engine. In function, the high speed version of the FP parser 642 is the same as the FP parser 542 discussed above.

Figure 7:
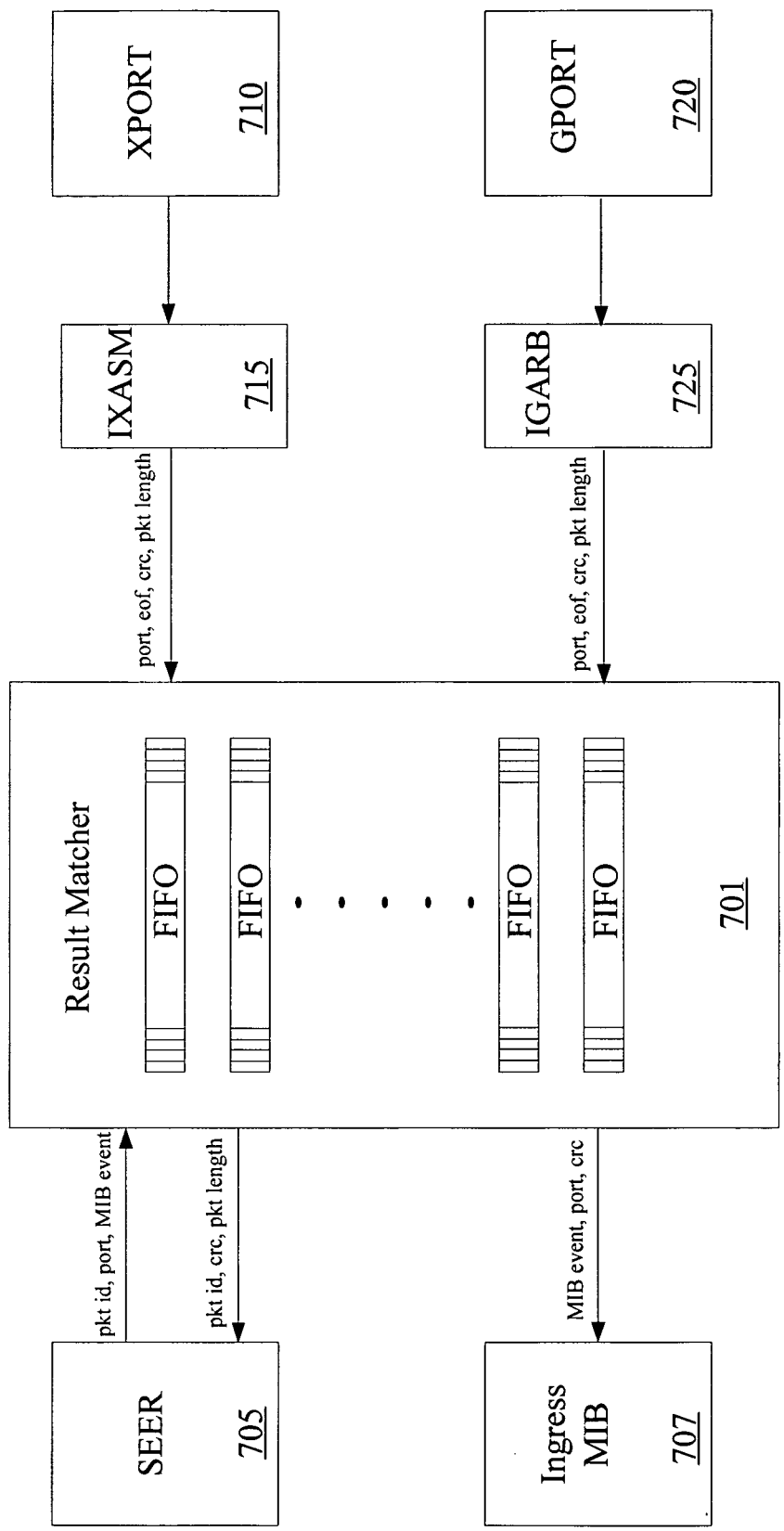
FIG. 7 illustrates a result matcher, according to certain embodiments of the present invention.

The result matcher is illustrated in greater detail in FIG. 7. It is noted that the result matcher may be used commonly between the parsers or each parser may utilize its own result matcher. In the embodiment illustrated, both types of ports 710 & 720 receive data and forward quantities to the result checker through the actions of the ingress assembler 715 and the ingress arbiter 725. The quantities include port number, presence of EOF, the CRC and the packet length. The result matcher acts as a series of FIFOs to match search results through the use of the search engine 705. The tag and the Management Information Base (MIB) event are matched with the packet length and the CRC status on a per port basis. The MIB event, CRC and port are also reported to the Ingress MIB 707. The search results are provided every 4 cycles for both network ports and high speed port. The structure allows for results to be stored in the result matcher per port if there is a delay that is longer than the incoming packet time and awaiting the end of packet results when the search delay is shorter than the incoming packet time.

After the process of parsing and evaluating of data received, a forwarding decision is made with regard to the received information. The forwarding decision is generally made as to what destination port the packet data should be sent to, although the decision can be made to drop a packet or forward a packet to a CPU or other controller through the CMIC 111. On egress, the packet is modified based on the parsing and evaluation of the network device. Such modification can include tagging, modification of header information or addition of a module header, if the egress port is the high speed port. The modification is performed on a cell basis to avoid delays in the forwarding of the packet data.

Figure 8:
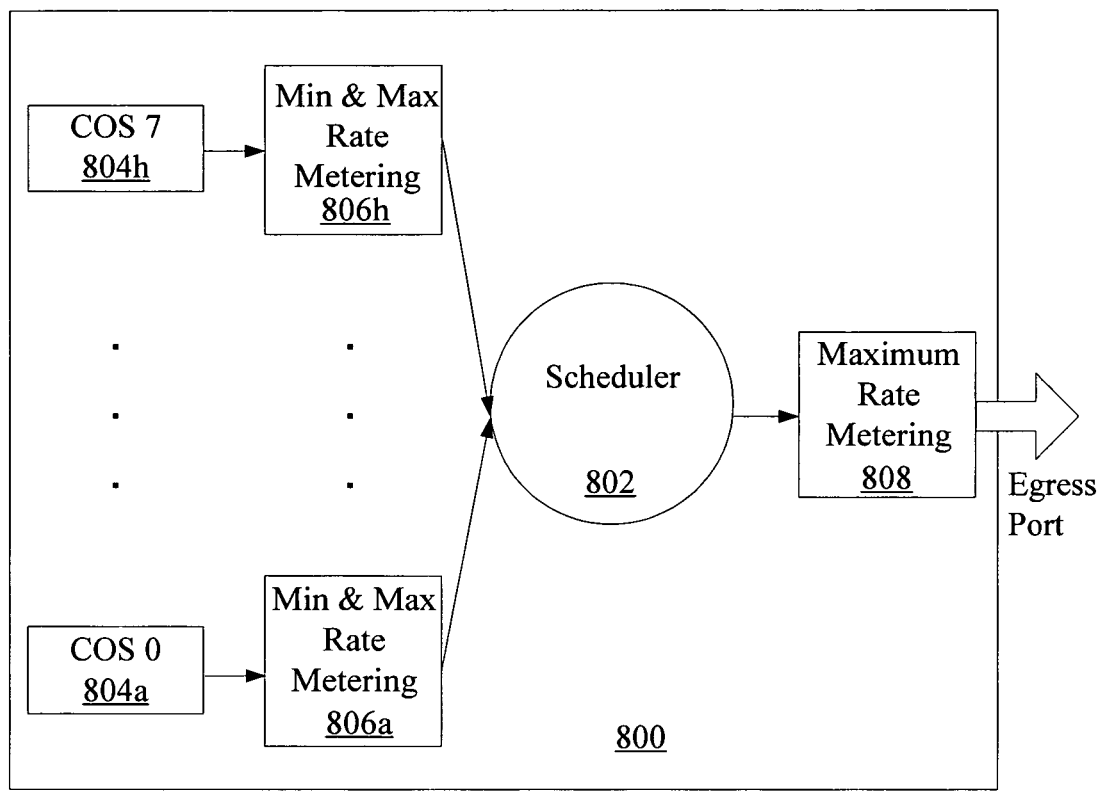
FIG. 8 illustrates a configuration of an egress port arbitration implemented in the present invention.

FIG. 8 illustrates a configuration of an egress port arbitration implemented in the present invention. According to FIG. 8, MMU 115 also includes a scheduler 802 that provides arbitration across the eight class of service queues 804a-804h associated with each egress port to provide minimum and maximum bandwidth guarantees. It is noted that while eight classes of service are discussed, other formulations of classes of service are also supported. Scheduler 802 is integrated with a set of minimum and maximum metering mechanisms 806a-806h that each monitors traffic flows on a class of service basis and an overall egress port basis. Metering mechanisms 806a-806h support traffic shaping functions and guarantee minimum bandwidth specifications on a class of service queue and/or egress port basis, wherein scheduling decisions by schedule 802 are configured largely via traffic shaping mechanisms 806a-406h along with a set of control masks that modify how scheduler 802 uses traffic shaping mechanisms 806a-806h.

As shown in FIG. 8, minimum and maximum metering mechanisms 806a-806h monitor traffic flows on a class of service queue basis and an overall egress port basis. Maximum and minimum bandwidth meters 806a-806h are used to feed state information to scheduler 802 which responds by modifying its service order across class of service queues 804. The network device 100 therefore enables system vendors to implement a quality of service model by configuring class of service queues 804 to support an explicit minimum and maximum bandwidth guarantee. In an embodiment of the invention, metering mechanisms 806a-806h monitor traffic flow on a class of service queue basis, provides state information regarding whether or nor a class of service flow is above or below a specified minimum and maximum bandwidth specification, and transmits the information into scheduler 802 which uses the metering information to modify its scheduling decisions. As such, metering mechanisms 806a-806h aid in partitioning class of service queues 804 into a set of queues that have not met the minimum bandwidth specification, a set that have met its minimum bandwidth but not its maximum bandwidth specification and a set that have exceeded its maximum bandwidth specification. If a queue is in the set that have not met its minimum bandwidth specification and there are packets in the queue, scheduler 802 services the queue according to the configured scheduling discipline. If a queue is in the set that have met its minimum bandwidth specification but has not exceeded it maximum bandwidth specification and there are packets in the queue, scheduler 802 services the queue according to the configured scheduling discipline. If a queue is in the set that have exceeded its maximum bandwidth specification or if the queue is empty, scheduler 802 does not service the queue.

The minimum and maximum bandwidth metering mechanisms 806a-806h may be implemented using a simple leaky bucket mechanism which tracks whether or not a class of service queue 804 has consumed its minimum or maximum bandwidth. The range of the minimum and maximum bandwidth setting for each class of service 804 is between 64 kbps to 16 Gbps, in 64 kbps increments. The leaky bucket mechanism has a configurable number of tokens "leaking" out of buckets, each of which is associated with one of queues 804a-804h, at a configurable rate. In metering the minimum bandwidth for a class of service queue 804, as packets enter the class of service queue 804, a number of tokens in proportion to the size of the packet is added to a respective bucket, having a ceiling of bucket high threshold. The leaky bucket mechanism includes a refresh update interface and a minimum bandwidth which defines how many tokens are to be removed every refresh time unit. A minimum threshold is set to indicate whether a flow has satisfied at least its minimum rate and a fill threshold is set to indicate how many tokens are in leaky bucket. When the fill threshold rises above minimum threshold, a flag which indicates that the flow has satisfied its minimum bandwidth specification is set to true. When fill threshold falls below minimum threshold, the flag is set to false.

After metering mechanisms 806a-806h indicate that the maximum bandwidth specified has been exceeded high threshold, the scheduler 802 ceases to service the queue and the queue is classified as being in the set of queues that have exceeded it maximum bandwidth specification. A flag is then set to indicate that the queue has exceeded its maximum bandwidth. Thereafter, the queue will only receive service from scheduler 802 when its fill threshold falls below high threshold and the flag indicating that it has exceeded its maximum bandwidth is reset.

Maximum rate metering mechanism 808 is used to indicate that the maximum bandwidth specified for a port has been exceeded and operates in the same manner as meter mechanisms 806a-806h when the maximum total bandwidth has been exceeded. According to an embodiment of the invention, the maximum metering mechanism on a queue and port basis generally affects whether or not queue 804 or a port is to be included in scheduling arbitration. As such, the maximum metering mechanism only has a traffic limiting effect on scheduler 802.

On the other hand, minimum metering on a class of service queue 804 basis has a more complex interaction with scheduler 802. In one embodiment of the invention, scheduler 802 is configured to support a variety of scheduling disciplines that mimic the bandwidth sharing capabilities of a weighted fair queuing scheme. The weighted fair queue scheme is a weighted version of packet based fair queuing scheme, which is defined as a method for providing "bit-based round robin" scheduling of packets. As such, packets are scheduled for access to an egress port based on their delivery time, which is computed as if the scheduler is capable of providing bit-based round robin service. A relative weight field influences the specifics of how the scheduler makes use of the minimum metering mechanism, wherein the scheduler attempts to provide a minimum bandwidth guarantee.

In one embodiment of the invention, the minimum bandwidth guarantee is a relative bandwidth guarantee wherein a relative field determines whether or not scheduler 802 will treat the minimum bandwidth metering settings as a specification for a relative or an absolute bandwidth guarantee. If the relative field is set, the scheduler treats minimum bandwidth 806 setting as a relative bandwidth specification. Scheduler 802 then attempts to provide relative bandwidth sharing across backlogged queues 804.

As discussed above, the present invention allows for more flexible use and configuration of lookup tables in memory. It should be noted that for particular embodiments discussed above, where lookup tables are set up in memory external to the network device, the concept of table sharing may be important in allowing more tables to be kept in smaller memory areas. Three memory sharing process are discussed below, where those processes may be used separately or together.

Figures 9A, 9B:
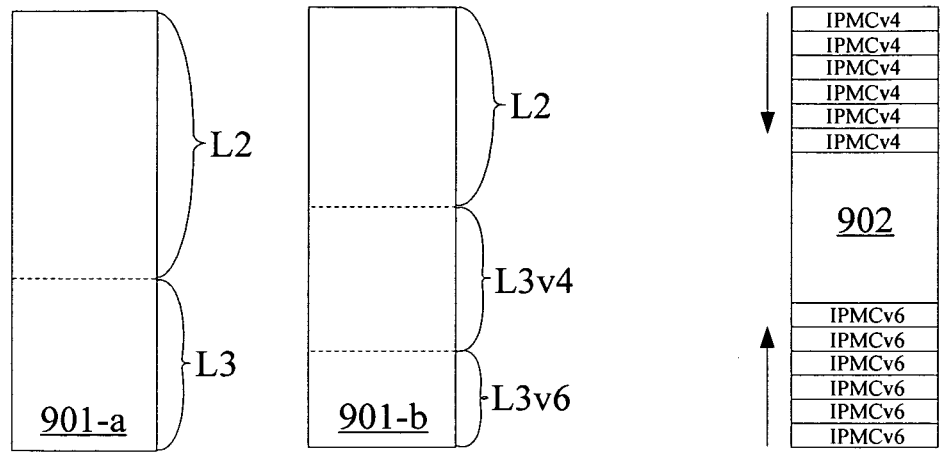
FIG. 9 illustrates sharing of tables, according to several embodiments of the present invention, with FIG. 9(*a*) illustrating static table separation, FIG. 9(*b*) illustrating dynamically updated tables and FIG. 9(*c*) illustrating table separation based on a key format.

The first table sharing process involves the setting of static block boundaries, as illustrated in FIG. 9(a). The memory space is broken into blocks that can be designated as Table A, Table B, etc. The assignment of blocks is statically configured by software and the network device does not change the configuration. A table 901-a may be configured into a first table containing L2 entries and a second table containing L3 entries. Alternatively, the same table 901-b may be configured through different blocks, to tables having L2, L3v4 and L3v6 entries. Thus the software at start up has the option of partitioning the blocks as needed for the environment in which the network device is being used. In a particular embodiment, the table is separated into four blocks.

Another table sharing process involves more use of the hardware of the network device to control the table sharing. As illustrated in FIG. 9(b), the table entries of the table 902 are inserted in two directions. The memory space is broken into blocks, for example eight blocks, that can be designated as Table A or Table B. Table A grows top down, while Table B grows bottom up. When the hardware is instructed to insert an entry into Table A for the first time, it designates block 0 as Table A. When the hardware is instructed to insert an entry into Table B for the first time, it designates, for example, block 7 as Table B. When a block becomes full, a new block is assigned to dynamically grow the table either up or down. When the two tables meet, i.e. there are no further blocks left to grow, the tables are full. In other words, the table can be constructed on the fly by the network device to respond to its processing needs.

Figure 9C:
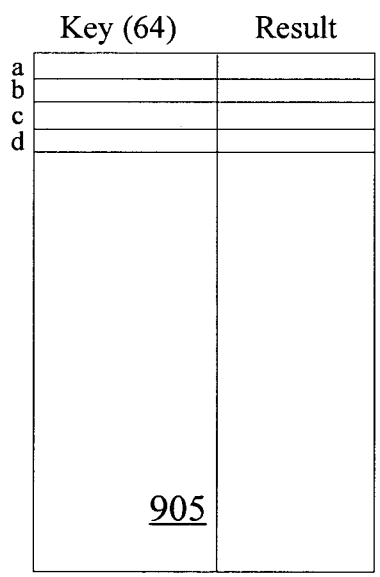

A third table sharing process involves the separation of a table based on key format. The table type is encoded into the key itself, so that there is an entry by entry sharing of the memory space. FIG. 9(c) illustrates the process. In the embodiment illustrated, no blocks are needed, but the key is used to determine whether a particular table is used. The key and result entries are in table 905. The key is 64 bits, in one embodiment, and certain bits that are not used can be used to identify the type of entry. Thus, for example if bits [63:56]=FF, that may detail that the entry is an IPv6 entry, whereas other bit values may indicate that it is an IPv4 entry.

The above-discussed processes of table sharing of memory space allow for extremely configurable switching by the network device. Static table boundaries, as discussed in the first method, allow a customer to mold the tables into a configuration that is customized for their particular environment. Table separation based on the key, as discussed in the third method, and table separation based on dynamically updated block boundaries, as discussed in the above second method, allow the network device to dynamically grow and/or shrink tables based on how the customer uses and populates the tables.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for processing data on a data network, the network device comprising:
    a port interface, in communication with a plurality of ports, configured to receive data packets from a data network and to send processed data packets to one or more egress ports of the plurality of ports;
    a packet evaluation module, in communication with the port interface, configured to forward the received data packets to both a tunnel parser and a parser FIFO to maintain a same packet order;
    the tunnel parser configured to determine whether tunneling is being employed by checking the received data packets for inner and outer tags;
    a parser configured to parse fields of the received data packets;
    the parser FIFO configured to maintain lengths of the received packets; and
    a search engine, in communication with the packet evaluation module, configured to perform searches in at least one lookup table, the searches being based on values of the parsed data packets and to return search results from the lookup table to the packet evaluation module, wherein the obtained search results include a tunnel type for the packets and wherein the search results are used by the packet evaluation module to determine an egress port of the network device from which to send a received packet to a destination address,
    wherein at least one lookup table includes both entries of a first type used to determine an egress port of the network device from which to send a first type of received data packet to a destination address and entries of a second type used to determine an egress port of the network device from which to send a second type of received data packet to a destination address, where the search engine is configured to distinguish between the first and second types of entries in the at least one lookup table.

2. The network device according to claim 1, wherein the at least one lookup table includes a first static block and a second static block, wherein the first static block includes entries of the first type and wherein the second static block includes entries of the second type.

3. The network device according to claim 2, wherein the at least one lookup table is allocated in a fixed size memory block and wherein the search engine is configured to partition the memory block into the first and second static blocks and to configure the first and second static blocks with the entries of the first type and the entries of the second type, respectively, at an initialization time for the network device.

4. The network device according to claim 1, wherein the at least one lookup table is dynamically allocated into a first block configured to store entries of the first type and a second block configured to store entries of the second type, and wherein the dynamic allocation is based on a number of entries of each type and wherein the dynamic allocation is updated based on changes in the number of entries of each type.

5. The network device according to claim 4, wherein the at least one lookup table is defined from a low memory location to a high memory location and the first block is dynamically allocated for entries of the first type at the low memory location and second block is allocated for entries of the second type at the high memory location.

6. The network device according to claim 1, wherein the at least one lookup table is divided among the entries of the first type and the entries of the second type on a table entry by table entry basis, where a key format section of a particular table entry determines a particular type of entry for that particular table entry.

7. The network device according to claim 1, wherein the at least one lookup table resides on memory that is external to the network device.

8. A method for processing data in a network device, the method comprising the steps of:
    receiving a data packet at one port of a plurality of ports;
    determining whether tunneling is being employed by checking the received data packet for outer and inner tags;
    parsing the received data packet and maintaining a length of the received data packet;
    searching at least one lookup table based on values of the parsed data packet;
    obtaining search results from the at least one lookup table, wherein the obtained search results include a tunnel type for the packet;
    modifying the received data packet to form a processed data packet based on the search results; and
    sending the processed data packet to an egress port of the plurality of ports, wherein the egress port is selected based on the obtained search results;
    wherein the at least one lookup table includes both entries of a first type used to determine an egress port of the network device from which to send a first type of received packet to a destination address and entries of a second type used to determine an egress port of the network device from which to send a second type of received packet to a destination address, where the searching distinguishes between the first and second types of entries in the at least one lookup table.

9. The method according to claim 8, wherein the at least one lookup table is allocated in a fixed size memory block and further comprising dividing the at least one lookup table into a first static block and a second static block, wherein the first static block includes entries of the first type and wherein the second static block includes entries of the second type.

10. The method according to claim 9, further comprising setting up the first and second static blocks with the entries of the first type and the entries of the second type, respectively, at an initialization time for the network device.

11. The method according to claim 8, further comprising dynamically allocating the at least one lookup table into a first block configured to store entries of the first type and a second block configured to store entries of the second type, and wherein the dynamic allocation is based on a number of entries of each type and wherein the dynamic allocation is updated based on changes in the number of entries of each type.

12. The method according to claim 11, further comprising:
defining the at least one lookup table from a low memory location to a high memory location; and
wherein dynamically allocating the at least one lookup table into a first block and a second block includes dynamically allocating entries of the first type at the low memory location and dynamically allocating entries of the second type at the high memory location.

13. The method according to claim 8, further comprising dividing the at least one lookup table among the entries of the first type and the entries of the second type on a table entry by table entry basis, where a key format section of a particular table entry determines a particular type of entry for that particular table entry.

14. The method according to claim 8, wherein searching lookup tables comprises searching lookup tables residing on memory that is external to the network device.

15. A network device for processing data, the network device comprising:
port means, in communication with a plurality of ports, for receiving a data packet at one port of a plurality of ports and sending a processed data packet to an egress port of the plurality of ports;
determining means for determining whether tunneling is being employed by checking the data packet for outer and inner tags;
parsing means for parsing the received data packet and for maintaining a length of the received data packet; and
searching means for searching lookup tables using values of the parsed data packet and obtaining search results, wherein the search results include a tunnel type for the parsed data packet;
wherein at least one lookup table includes both entries of a first type used to determine an egress port of the network device from which to send a first type of received data packet to a destination address and entries of a second type used to determine an egress port of the network device from which to send a second type of received data packet to a destination address.

16. The network device according to claim 15, further comprising means for dividing the at least one lookup table into a first static block and a second static block, wherein the first static block includes entries of the first type and wherein the second static block includes entries of the second type.

17. The network device according to claim 16, further comprising means for setting up the first static block and the second static block at an initialization time for the network device.

18. The network device according to claim 15, further comprising means for dynamically allocating the at least one lookup table into a first block configured to store entries of the first type and a second block configured to store entries of the second type, and wherein the dynamic allocation is based on a number of entries of each type and wherein the dynamic allocation is updated based on changes in the number of entries of each type.

19. The network device according to claim 18, wherein:
the at least one lookup table is defined from a low memory location to a high memory location, and
dynamically allocating the at least one lookup table into a first block and a second block includes dynamically allocating entries of the first type at the low memory location and dynamically allocating entries of the second type at the high memory location.

20. The network device according to claim 15, further comprising means for dividing the at least one lookup table among the entries of the first type and the entries of the second type on a table entry by table entry basis, where a key format section of a particular table entry determines a particular type of entry for that particular table entry.

21. The network device of claim 1, wherein the entries of the first type include IPv4 entries and wherein the entries of the second type include IPv6 entries.

22. The network device of claim 1, wherein the entries of the first type include L2 entries and wherein the entries of the second type include L3 entries.

23. A network device for processing data on a data network, the network device comprising:
a port interface, in communication with a plurality of ports, configured to receive data packets from a data network and to send processed data packets to one or more egress ports of the plurality of ports;
a packet evaluation module, in communication with the port interface, configured to forward the received data packets to both a tunnel parser and a parser FIFO to maintain a same packet order;
the tunnel parser configured to determine whether tunneling is being employed by checking the received packets for outer and inner tags;
a parser configured to parse fields of the received packets;
the parser FIFO configured to maintain lengths of the received packets; and
a search engine, in communication with the packet evaluation module, configured to perform searches in at least one lookup table, the searches being based on values of the parsed data packets, including a checksum of an IP header of the data packets, and to return search results from the lookup table to the packet evaluation module, the search results including a tunnel type for the received packets, wherein the search results are used by the packet evaluation module to determine an egress port of the network device from which to send a received packet to a destination address,
wherein at least one lookup table includes both entries of a first type used to determine an egress port of the network device from which to send a first type of received data packet to a destination address and entries of a second type used to determine an egress port of the network device from which to send a second type of received data packet to a destination address, where the search engine is configured to distinguish between the first and second types of entries in the at least one lookup table.

* * * * *